United States Patent [19]

Issa

[11] Patent Number: 5,584,209
[45] Date of Patent: Dec. 17, 1996

[54] ELECTRIC CIRCUIT FOR MANUAL SHIFTING OF AN ELECTRONICALLY-CONTROLLED AUTOMATIC TRANSMISSION SYSTEM

[75] Inventor: Nabil M. Issa, Detroit, Mich.

[73] Assignee: Chrysler Corporation, Auburn Hills, Mich.

[21] Appl. No.: 508,946

[22] Filed: Jul. 28, 1995

[51] Int. Cl.[6] ............................................. F16H 59/04
[52] U.S. Cl. ................................. 74/335; 200/61.88
[58] Field of Search ................... 74/475, 335; 200/61.88

[56] References Cited

U.S. PATENT DOCUMENTS

| | | |
|---|---|---|
| 4,380,177 | 4/1983 | Reinecke et al. . |
| 4,442,730 | 4/1984 | Snoy . |
| 4,463,623 | 8/1984 | Miyata et al. . |
| 4,473,141 | 9/1984 | Mochida ............................ 74/475 |
| 4,513,276 | 4/1985 | Kubota et al. ..................... 74/475 |
| 4,513,847 | 4/1985 | Hansen . |
| 4,519,266 | 5/1985 | Reinecke . |
| 4,521,650 | 6/1985 | Oswald . |
| 4,569,244 | 2/1986 | Akerstrom . |
| 4,570,502 | 2/1986 | Klatt . |
| 4,592,249 | 6/1986 | Lehmann et al. . |
| 4,612,820 | 9/1986 | Behrens . |
| 4,630,499 | 12/1986 | Hopkins . |
| 4,633,987 | 1/1987 | Rogner et al. . |
| 4,646,582 | 3/1987 | Kijima . |
| 4,784,007 | 11/1988 | Ishida et al. . |
| 4,875,391 | 10/1989 | Leising et al. ..................... 74/866 |
| 4,987,792 | 1/1991 | Mueller et al. . |
| 4,991,535 | 2/1991 | Kobayashi et al. . |
| 5,044,220 | 9/1991 | Raff et al. . |
| 5,062,314 | 11/1991 | Maier et al. . |
| 5,070,740 | 12/1991 | Giek et al. . |
| 5,079,966 | 1/1992 | Easton et al. . |
| 5,090,269 | 2/1992 | Ohtsuka et al. ................... 74/335 |
| 5,119,695 | 6/1992 | Milunas et al. . |
| 5,129,286 | 7/1992 | Nitz et al. . |
| 5,150,633 | 9/1992 | Hillgartner . |
| 5,161,422 | 11/1992 | Suman et al. . |
| 5,197,344 | 3/1993 | Maier et al. . |
| 5,232,254 | 7/1993 | Baker et al. ..................... 200/61.88 |
| 5,406,860 | 4/1995 | Easton et al. . |

FOREIGN PATENT DOCUMENTS

| | | |
|---|---|---|
| 0122014 | of 1985 | European Pat. Off. . |
| 0207260 | of 1987 | European Pat. Off. . |
| 2033200 | of 1970 | France . |
| 2298827 | of 1976 | France . |
| 3717675 | of 1988 | Germany . |
| 8078813 | of 1988 | Germany . |
| WO 8700806 | of 1987 | WIPO . |

OTHER PUBLICATIONS

"In The News", Upfront, Feb. 1994.
Six Speeds for the Price of Four: A Simple and Compact Automatic Transaxle, David Ganoung, SAE Technical Paper Series 941008, 1994.
Transportation Electronics: Proceedings of the International Congress on Transportation Electronics, S. Tanaka et al., SAE, 1986.

*Primary Examiner*—Dirk Wright
*Attorney, Agent, or Firm*—Thomas G. Pasternak

[57] ABSTRACT

An electric circuit for manual shifting of an electronically-controlled automatic transmission system having a controller and a shift lever includes a first switch, a second switch, and a voltage divider interconnecting the first switch and the second switch and the controller to allow passing of an input signal from either the first switch or the second switch to the controller in response to the shift lever closing the first switch or the second switch.

7 Claims, 6 Drawing Sheets

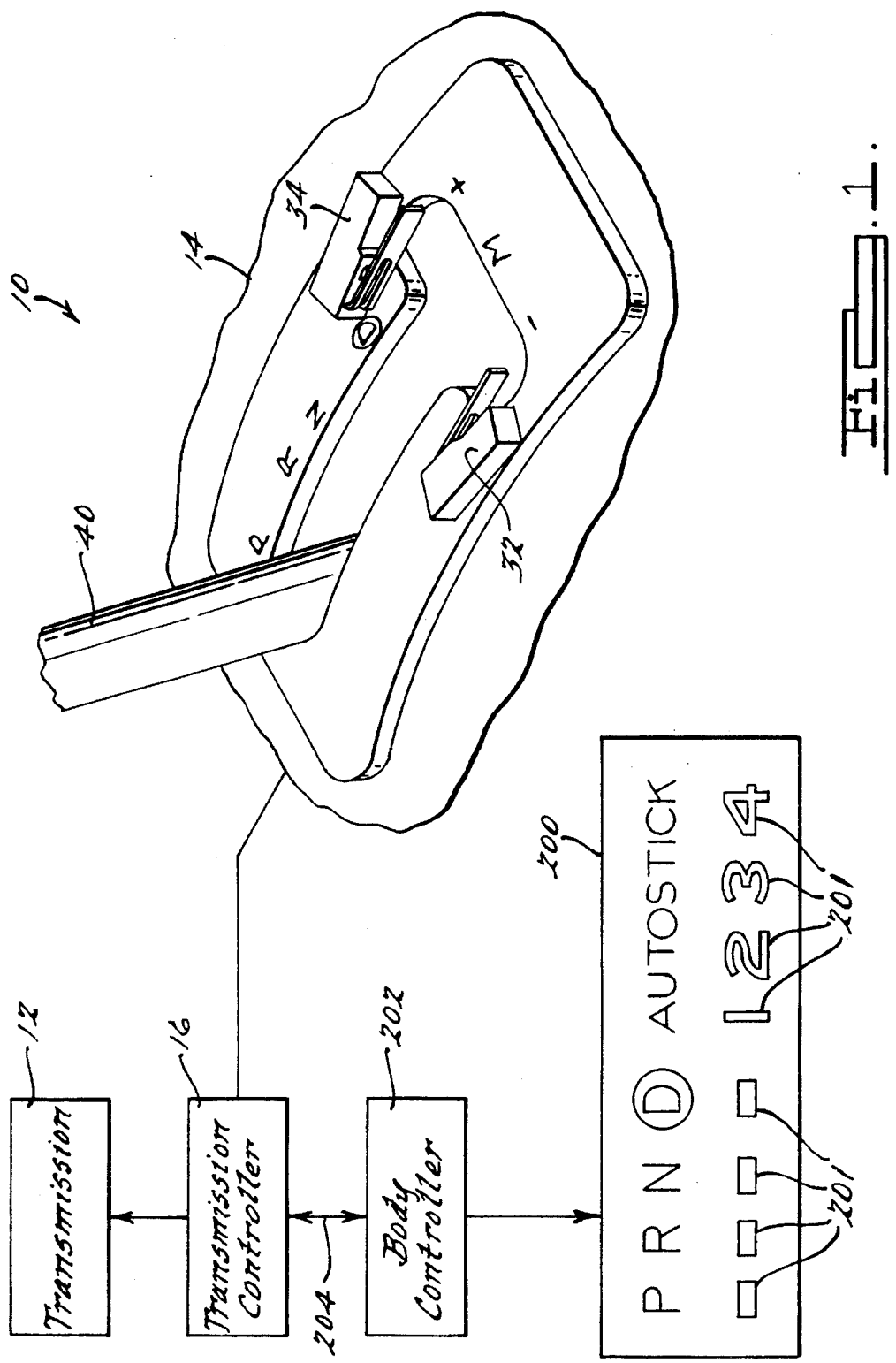

ELECTRIC CIRCUIT FOR MANUAL SHIFTING OF AN ELECTRONICALLY-CONTROLLED AUTOMATIC TRANSMISSION SYSTEM

BACKGROUND OF THE INVENTION

1. Field of the Invention

The present invention relates generally to automatic transmission systems and, more particularly, to an electric circuit for manual shifting of an electronically-controlled automatic transmission system.

2. Description of the Related Art

Automotive vehicles require a power train to transmit the force of an engine to wheels of the vehicle. The power train's main component is typically referred to as the "transmission". Engine torque and speed are converted in the transmission in accordance with the tractive-power demand of the vehicle. Transmissions are generally referred to as manually actuated or automatic transmissions. Manual transmissions generally include mechanical mechanisms for coupling rotating gears to produce different ratio outputs to drive the wheels. Automatic transmissions are designed to take automatic control of the frictional units, gear ratio selection and gear shifting.

Recently, there has been a demand to provide an automatic transmission that may be manually shifted in addition to normal automatic transmission operation. Also, there is a need in the art to simulate a manual transmission with no clutch pedal in an electronically-controlled automatic transmission system to provide a vehicle operator with more vehicle control when needed.

SUMMARY OF THE INVENTION

It is, therefore, one object of the present invention to provide a method of shifting in a manual mode of an electronically- controlled automatic transmission system.

It is another object of the present invention to provide an improved shift control method to manually shift an electronically-controlled automatic transmission system.

It is yet another object of the present invention to provide an electric circuit for manual shifting of an electronically-controlled automatic transmission system.

It is still another object of the present invention to provide an electronic gear display for displaying a selected gear for manual shifting of an electronically-controlled automatic transmission system.

It is a further object of the present invention to provide a method of displaying a shift lever position by which one controller (i.e., one part) can be used for an automatic and manual mode of an electronically-controlled automatic transmission system.

To achieve the foregoing objects, the present invention is an electric circuit for manual shifting of an electronically-controlled automatic transmission system having a controller and a shift lever. The electric circuit includes a first switch and a second switch. The electric circuit also includes a voltage divider interconnecting the first switch and the second switch and the controller to allow passing of an input signal from either the first switch or the second switch to the controller in response to the shift lever closing the first switch or second switch.

One advantage of the present invention is that a method is provided of shifting in a manual mode of an electronically-controlled automatic transmission system. Another advantage of the present invention is that an electric circuit is provided for manual shifting of an electronically-controlled automatic transmission system. Yet another advantage of the present invention is that the electric circuit uses a voltage divider that allows the use of a single analog-to-digital input rather than two digital inputs. Still another advantage of the present invention is that another electric circuit is provided which employs two hall effect switches. A further advantage of the present invention is that an electronic gear display is provided for displaying a selected gear when shifting in a manual mode of an electronically-controlled automatic transmission system. A still further advantage of the present invention is that the electronic gear display also provides for displaying the position of the shift lever for the automatic mode of operation of the automatic transmission.

Other objects, features and advantages of the present invention will be readily appreciated as the same becomes better understood after reading the subsequent description in conjunction with the accompanying drawings.

BRIEF DESCRIPTION OF THE DRAWINGS

FIG. 1 is a schematic view of an electronic gear display, according to the present invention, illustrated in operational relationship with an electronically-controlled automatic transmission system.

DESCRIPTION OF THE PREFERRED EMBODIMENT(S)

Referring to FIG. 1, an electronically-controlled automatic transmission system 10 is shown. The transmission system 10 includes an electronically-controlled automatic transmission 12, a shift control mechanism 14, and an electronic transmission controller 16 interconnecting the shift control mechanism 14 and automatic transmission 12. Such an electronically-controlled automatic transmission 12 and transmission controller 16 are disclosed in U.S. Pat. No. 4,875,391 to Leising et al., the disclosure of which is hereby incorporated by reference. Such a shift control mechanism 14 is disclosed in copending patent application, Ser. No. 08/253,014, filed Jun. 2, 1994, to Anderson et al. and entitled "Shift Control Mechanism to Manually Shift an Automatic Transmission", the disclosure of which is incorporated by reference, and in copending patent application, Ser. No. 08/508,946, filed Jul. 28, 1995, to Anderson et al. and entitled "Shift Control Mechanism to Manually Shift an Automatic Transmission", the disclosure of which is incorporated by reference.

Figure 2A:
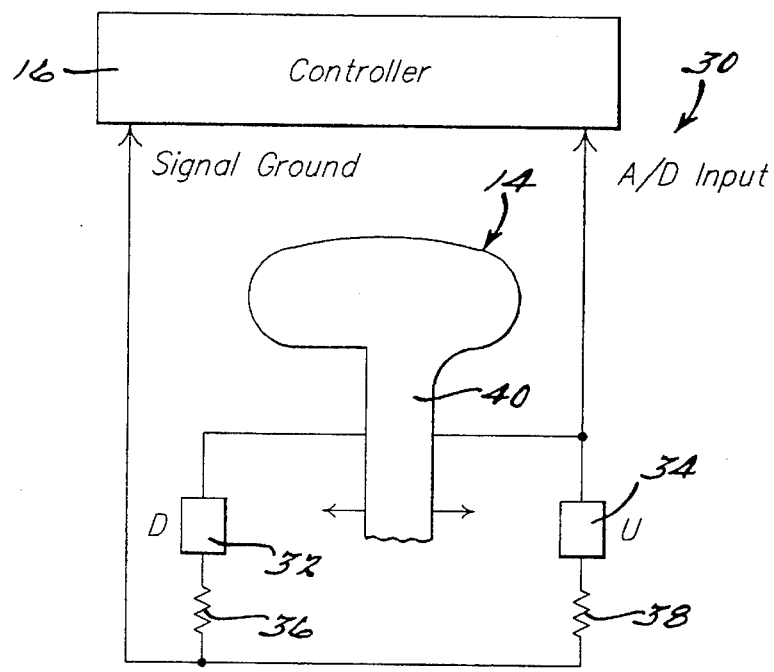
FIG. 2A is a schematic view of an electric circuit, according to the present invention, for manual shifting of the electronically-controlled automatic transmission system of FIG. 1.

Referring to FIG. 2A, an electric circuit 30, according to the present invention, is shown for manually shifting the electronically-controlled automatic transmission 12. The electric circuit 30 is connected on its output side to the transmission controller 16. The electric circuit 30 is also connected on its input side to two momentary contact switches 32 and 34 on the shift lever mechanism 14. The first momentary switch 32 is used to call for a downshift (D) of the automatic transmission 12 and the second momentary switch 34 is used to call for an upshift (U) of the automatic transmission 12. The electric circuit 30 provides one signal to the transmission controller 16 from its output side. The electric circuit 30 includes a voltage divider having a first resistor 36 connected to the first momentary switch 32 and a second resistor 38 connected to the second momentary switch 34. The first resistor 36 has a resistance value different from the second resistor 38. Preferably, the first resistor 36 has a resistance value of forty thousand (40 k) ohms and the second resistor 38 has a resistance value of six thousand eight hundred (6.8 k) ohms.

In operation, when a shift lever 40 of the shift lever mechanism 14 closes the second momentary switch 34, the voltage divider provides a voltage level different than that provided when the shift lever 40 closes the first momentary switch 32. The transmission controller 16 has an analog-to-digital converter (ADC) (not shown) to receive the output signal of the electric circuit 30 to determine the voltage of the output signal. The transmission controller 16 also has a voltage pull-up (not shown) for the A/D input. For example, an input voltage to the transmission controller 16 of 5.0 v indicates that neither switch 32 nor switch 34 is closed, between 1.5 v to 3.0 v indicates that the upshift or second momentary switch 34 is closed, and between 3.5 v to 4.5 v indicates that the downshift or first momentary switch 32 is closed. Hence, when the second momentary switch 34 is closed, the transmission controller 16 calls for an upshift of the automatic transmission 12. Thus, the electric circuit 30 provides a multiplexing scheme, allowing the passing of either of the two input signals from the switches 32 and 34 using one common output signal.

Figure 2B:
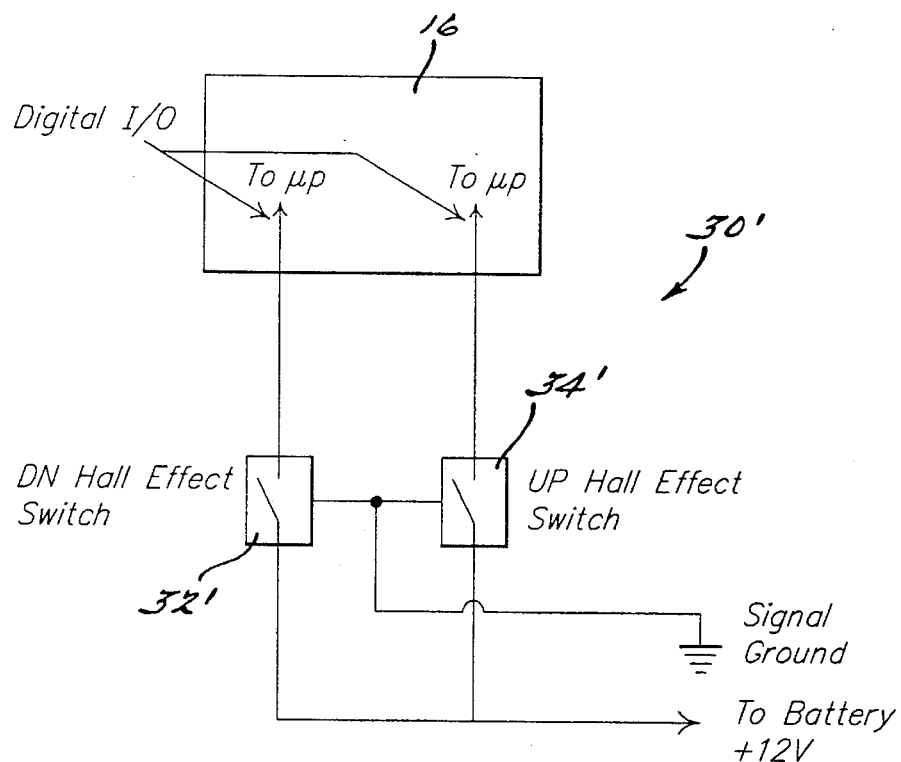
FIG. 2B is a schematic view of another electric circuit, according to the present invention, for shifting of the electronically-controlled automatic transmission system of FIG. 1.

Referring to FIG. 2B, an electric circuit 30' according to the present invention, is shown for manually shifting the electronically-controlled automatic transmission 12. The electric circuit 30' is connected on its output side to the transmission controller 16. The electric circuit 30' is also connected on its input side to two hall effect switches 32' and 34' on the shift lever mechanism 14. The first hall effect switch 32' is used to call for a downshift (D) of the automatic transmission 12 and the second hall effect switch 34' is used to call for an upshift (U) of the automatic transmission 12. The electric circuit 30' provides two digital signals to the transmission controller 16 from its output side. The electric circuit 30' has the two hall effect switches 32' and 34' connected to each other and the signal ground. Each of the hall effect switches 32' and 34' are connected to a voltage source such as twelve (12) volts from a battery (not shown) of the vehicle.

In operation, when a shift lever 40 of the shift lever mechanism 14 closes either the first hall effect switch 32' or the second hall effect switch 34'. The transmission controller 16 has an analog-to-digital converter (ADC) (not shown) which receives the output signal of the electric circuit 30'. Hence, when the second hall effect switch 34' is closed, the transmission controller 16 calls for an upshift of the automatic transmission 12. Also, when the first hall effect switch 32' is closed, the transmission controller calls for a downshift of the automatic transmission 12.

Referring to FIGS. 3A through 3E, a method, according to the present invention, of shifting in a manual mode of the electronically-controlled automatic transmission system 10 is shown. The transmission controller 16 controls the automatic transmission 12 and provides two modes of forward shifting: an automatic mode when the shift lever 40 is in the overdrive position; and a manual mode when the shift lever 40 is in the "manual" (M or autostick) position. The transmission controller 16 continuously monitors the position of the shift lever 40 and shifts the automatic transmission 12 accordingly. It should be appreciated that the methodology is stored in memory (not shown) of the transmission controller 16.

Figure 3A:
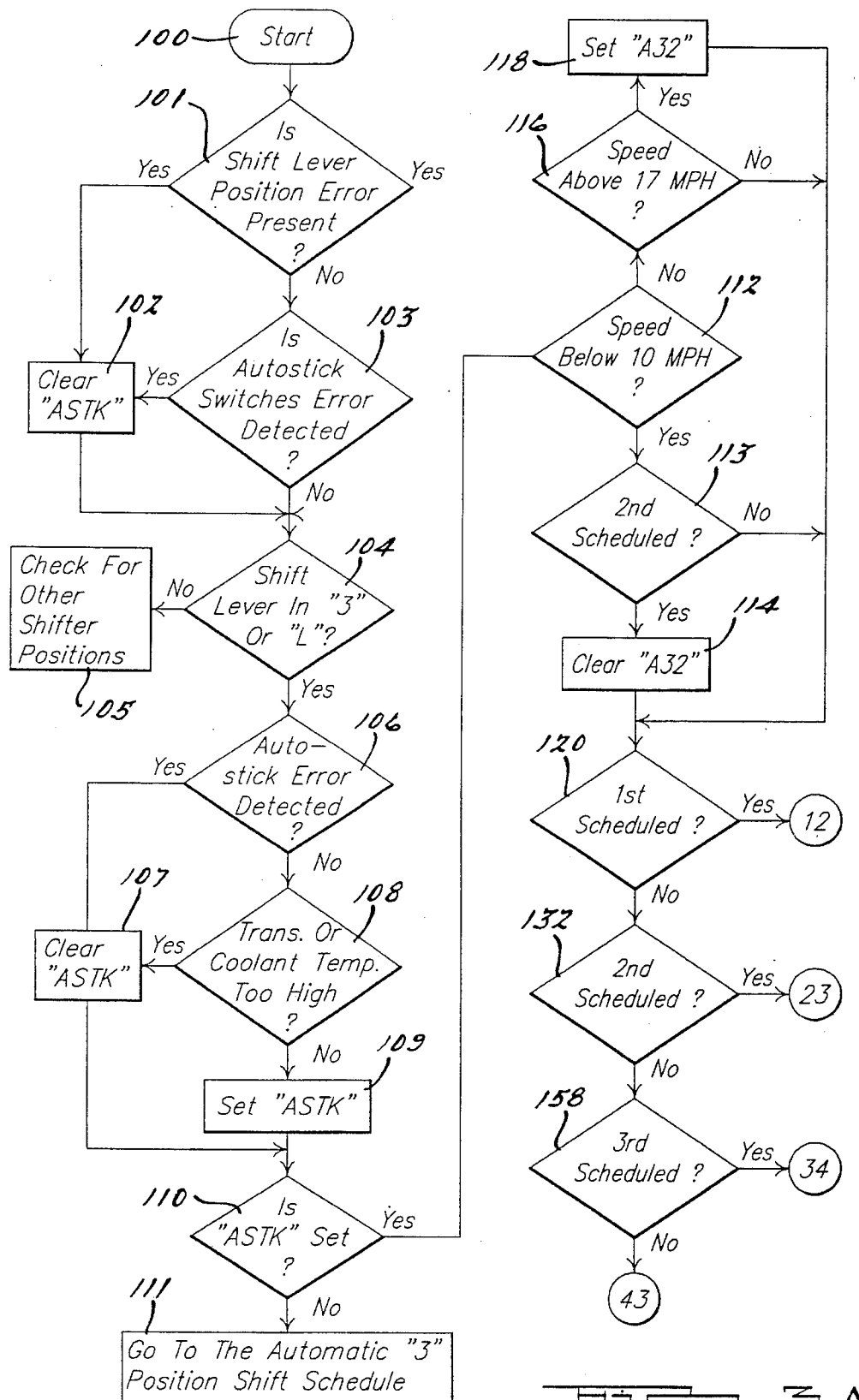
FIG. 3A through 3E are flowcharts of a method, according to the present invention, of shifting in a manual mode of the electronically-controlled automatic transmission system of FIG. 1.
Figure 3B:
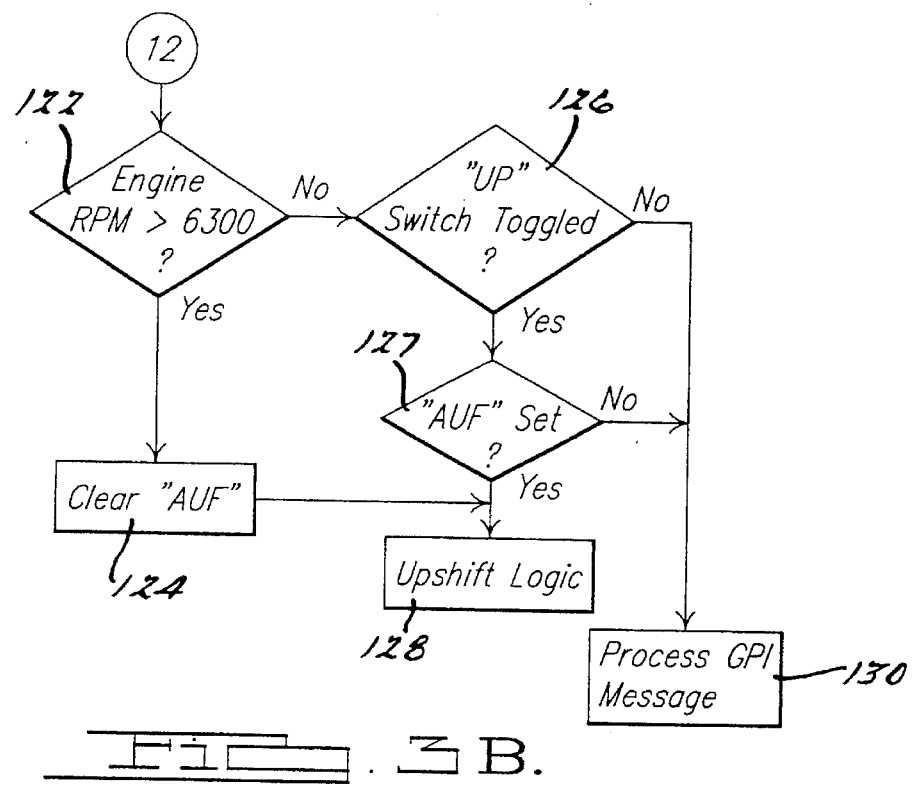

Referring to FIG. 3A, the methodology starts in bubble 100 and advances to diamond 101. In diamond 101, the methodology determines whether a shift lever position error is present as determined by a separate shift lever position logic such as in U.S. Pat. No. 4,875,391. If so, the methodology advances to block 102 and clears an autostick (ASTK) flag. If not, the methodology advances to diamond 103 and determines whether an autostick switch error is detected, for example, by looking at a counter. If so, the methodology advances to block 102 previously described. If not or after block 102, the methodology advances to diamond 104. In diamond 104, the methodology determines whether the shift lever 40 is in the "3" or "L" position for a non-autostick vehicle. The transmission controller 16 receives a combination of four (4) signals from a manual valve lever position sensor (not shown) which are decoded or analyzed to determine the position of the shift lever 40. If the shift lever 40 is not in the "3" or "L" position, the methodology advances to block 105 and checks for other shift lever positions. The transmission controller 16 controls the automatic transmission 12 in accordance with the other shift lever positions. It should be appreciated that, every program loop, the methodology continuously checks for valid shift lever operation (no errors) and validates the autostick switches 32 and 34.

In diamond 104, if the shift lever 40 is in the "3" or "L" position, the methodology advances to diamond 106 and determines whether an autostick error is detected, for example, by looking for a flag. An error exists when there is a non-zero value in a manual counter (not shown) of the transmission controller 16, a shift lever position problem detected by the shift lever position (SLP) logic, or high temperature condition. The transmission controller 16 increments the manual counter if either switch 32 or 34 is closed while the shift lever 40 is not in the manual position or both switches 32 and 34 are closed at the same time. The transmission controller 16 decrements the manual counter when neither of these conditions are true. A high temperature condition occurs when the automatic transmission 12 is in the manual mode and either the transmission temperature or the engine coolant temperature exceeds a predetermined threshold. It should be appreciated that, when an error exists, the manual mode active flag is cleared by the transmission controller 16.

In diamond 106, if an autostick error is detected, the methodology advances to block 107 and clears the autostick flag. If an autostick error is not detected, the methodology advances to diamond 108 and determines whether the transmission temperature or engine coolant temperature is too high as previously described. If so, the methodology advances to block 107 previously described. If not, the methodology advances to block 109 and sets the autostick flag. After block 109 or 107, the methodology advances to diamond 110 and determines whether the autostick flag has been set. If not, the methodology advances to block 111 and goes to the automatic "3" position shift schedule of the shift schedule logic instead of the autostick or manual mode. It should be appreciated that since the methodology continuously validates the system, the autostick or manual mode can be reactivated when conditions permit.

If the autostick flag has been set in diamond 110, the methodology advances to diamond 112 and determines whether vehicle speed is below a predetermined value such as ten (10) mph. The transmission controller 16 will automatically shift the automatic transmission 12 for a 4-3 and 3-2 downshift when the vehicle speed goes below ten (10) mph. If the vehicle speed is below ten (10) mph, the methodology advances to diamond 113 and determines whether second gear is scheduled by the shift schedule logic. If so, the methodology advances to block 114 and clears a third-to-second downshift flag "A32". After block 114 or if second gear is not scheduled, the methodology advances to diamond 120 to be described. It should be appreciated that second gear is scheduled by the shift schedule logic.

In diamond 112, if the vehicle speed is not below ten (10) mph, the methodology advances to diamond 116 and determines whether the vehicle speed is above a second predetermined value such as seventeen (17) mph. The transmission controller 16 allows an upshift to fourth gear only when the vehicle speed is above seventeen (17) mph. If the vehicle speed is above seventeen (17) mph, the methodology advances to block 118 and sets the third-to-second downshift flag. After block 118 or if the vehicle speed is not above seventeen (17) mph, the methodology advances to diamond 120 to be described.

In diamond 120, the methodology determines whether first gear is scheduled by the shift schedule logic. If so, the methodology advances to diamond 122 and determines whether engine speed (rpm) is above a predetermined speed such as six thousand three hundred (6300) rpm. The transmission controller 16 will automatically shift the automatic transmission 12 for a 1-2 and 2-3 upshift when the engine speed goes above 6300 rpm. If the engine speed is above 6300 rpm, the methodology advances to block 124 and clears an autostick upshift flag "AUF". If the engine speed is not above 6300 rpm, the methodology advances to diamond 126 and determines whether the "up" or first switch 34 is toggled or closed to call for an upshift of the automatic transmission 12. The transmission controller 16 receives a signal from the electric circuit 30 to determine if the first switch 34 is closed. If so, the methodology advances to diamond 127 and determines whether the autostick upshift flag has been set. If so, or after block 124, the methodology advances to block 128 and executes upshift logic in accordance with the shift schedule logic. After block 128 or if the first switch 34 is not closed in diamond 126 or if an autostick upshift flag has not been set in diamond 127, the methodology advances to block 130 to process and send a gear position indicator (GPI) message to be described.

In diamond 120, if first gear is not scheduled, the methodology advances to diamond 132 and determines whether second gear is scheduled by the shift schedule logic. If so, the methodology advances to diamond 134 and determines whether the engine speed is above the predetermined speed of 6300 rpm. If so, the methodology advances to block 136 and clears the autostick upshift flag. If not, the methodology advances to diamond 138 and determines whether the first switch 34 is closed as previously described. If so, the methodology advances to diamond 140 and determines whether the autostick upshift flag has been set. If so, or after block 136, the methodology advances to block 142 and executes the upshift logic in accordance with the shift schedule logic. After block 142, the methodology advances to block 144 to process and send a gear position indicator message to be described.

In diamond 138, if the first switch 34 is not closed, the methodology advances to diamond 146 and determines whether the "down" or second switch 32 has been toggled or closed to call for a downshift of the automatic transmission 12. The transmission controller 16 receives a signal from the electric circuit 30 to determine if the second switch 32 is closed. If not, the methodology advances to block 144 previously described. If so, the methodology advances to diamond 148 and determines whether an autostick downshift flag "ADF" has been set. If not, the methodology advances to block 144 previously described. If so, the methodology advances to diamond 150 and determines whether throttle position is below a predetermined value such as five degrees (5°). If not, the methodology advances to diamond 152 and determines whether turbine speed of the automatic transmission 12 is below a predetermined value such as two thousand one hundred (2100) rpm. If not, the methodology advances to block 144 previously described. If so, the methodology advances to block 156 to be described.

In diamond 150, if the throttle position is below five degrees (5°), the methodology advances to diamond 154 and determines whether turbine speed of the automatic transmission 12 is less than another predetermined value such as two thousand two hundred fifty (2250) rpm. If not, the methodology advance to block 144 previously described. If so, the methodology advances to block 156 and executes downshift logic in accordance with the shift schedule logic. After block 156, the methodology advances to block 144 previously described.

In diamond 132, if second gear is not scheduled, the methodology advances to diamond 158 and determines whether third gear is scheduled by the shift schedule logic. If so, the methodology advances to diamond 160 in FIG. 3D. In diamond 160, the methodology determines whether vehicle speed is less than a predetermined value such as ten (10) mph. If so, the methodology advances to diamond 162 and determines whether the third-to-second downshift flag has been set. If not, the methodology advances to block 164 to process and send a gear position indicator message to be described.

In diamond 162, if the third-to-second downshift flag has been set, the methodology advances to block 166 and clears the third-to-second downshift flag. The methodology then advances to block 168 and clears the autostick downshift flag. The methodology then advances to block 170 and executes the downshift logic in accordance with the shift schedule logic. After block 170, the methodology advances to block 164 previously described.

In diamond 160, if the vehicle speed is not less than ten (10) mph, the methodology advances to diamond 172 and determines whether the first switch 34 is closed. If so, the methodology advances to diamond 174 and determines whether the autostick upshift flag has been set. If not, the methodology advances to block 164 previously described. If so, the methodology advances to diamond 176 and determines whether the vehicle speed is above another predetermined value such as sixteen (16) mph. If not, the methodology advances to block 164 previously described. If so, the methodology advances to block 178 and executes the upshift logic in accordance with the shift schedule logic. After block 178, the methodology advances to block 164 previously described.

In diamond 172, if the first switch 34 is not closed, the methodology advances to diamond 180 and determines whether the second switch 32 is closed as previously described. If not, the methodology advances to block 164 previously described. If so, the methodology advances to diamond 182 and determines whether the autostick downshift flag has been set. If not, the methodology advances to block 164 previously described. If so, the methodology advances to diamond 184 and determines whether the throttle position is below a predetermined value such as five degrees (5°). If so, the methodology advances to diamond 186 and determines whether turbine speed is less than a predetermined speed such as four thousand fifty (4050) rpm. If not, the methodology advances to block 164 previously described. If so, the methodology advances to block 188 and executes the downshift logic in accordance with the shift schedule logic. After block 188, the methodology then advances to block 164 previously described.

In diamond 184, if the throttle position is not below five degrees (5°), the methodology advances to diamond 190 and determines whether turbine speed is less than another predetermined speed such as three thousand eight hundred (3800) rpm. If not, the methodology advances to block 164 previously described. If so, the methodology advances to block 188 and executes the downshift logic in accordance with the shift schedule logic. After block 188, the methodology advances to block 164 previously described.

Figure 3E:
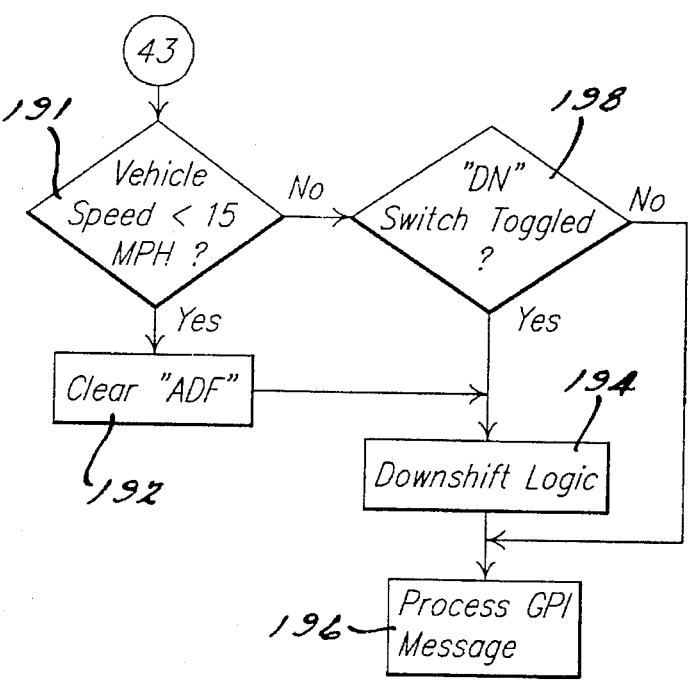
Figure 3C:
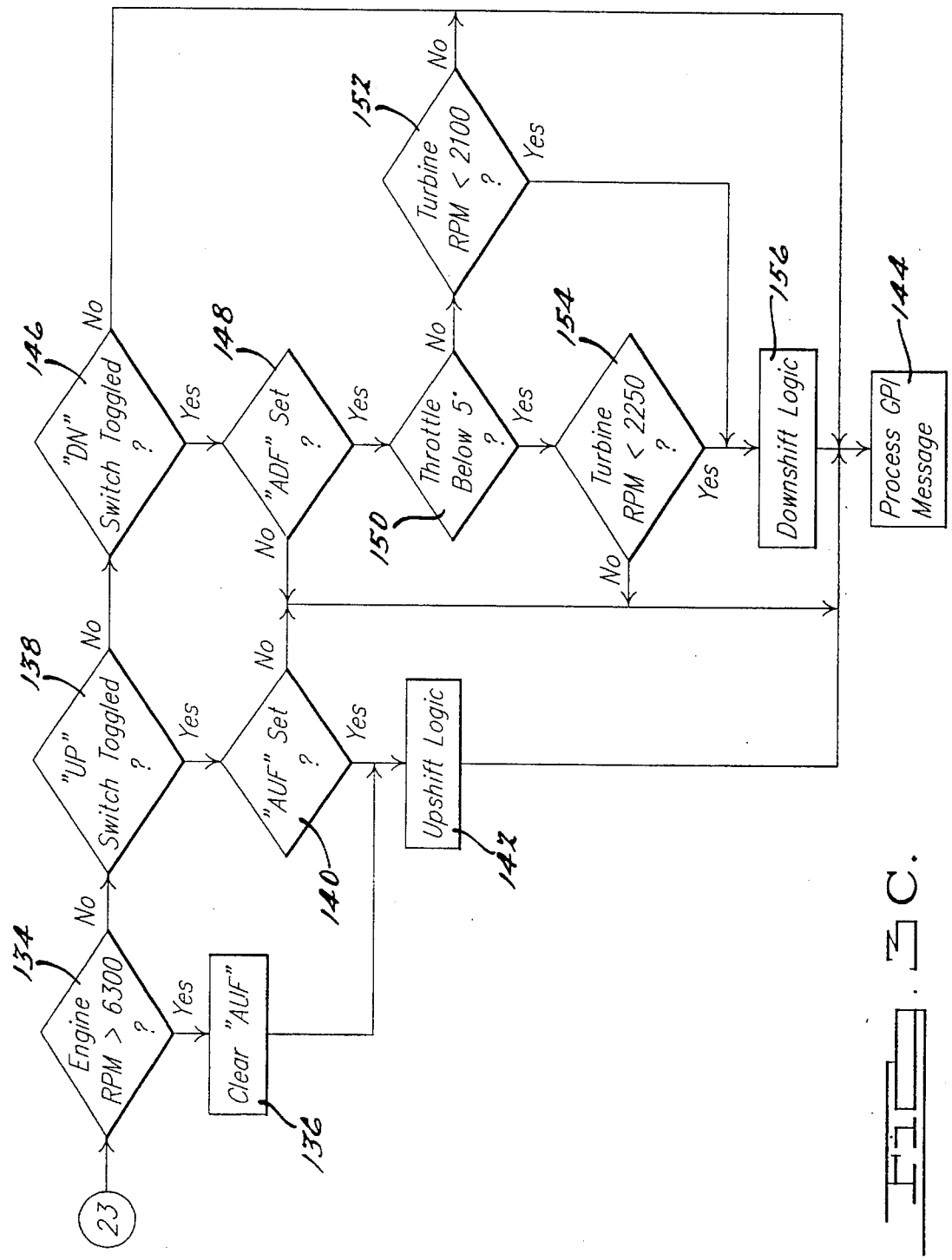
Figure 3D:
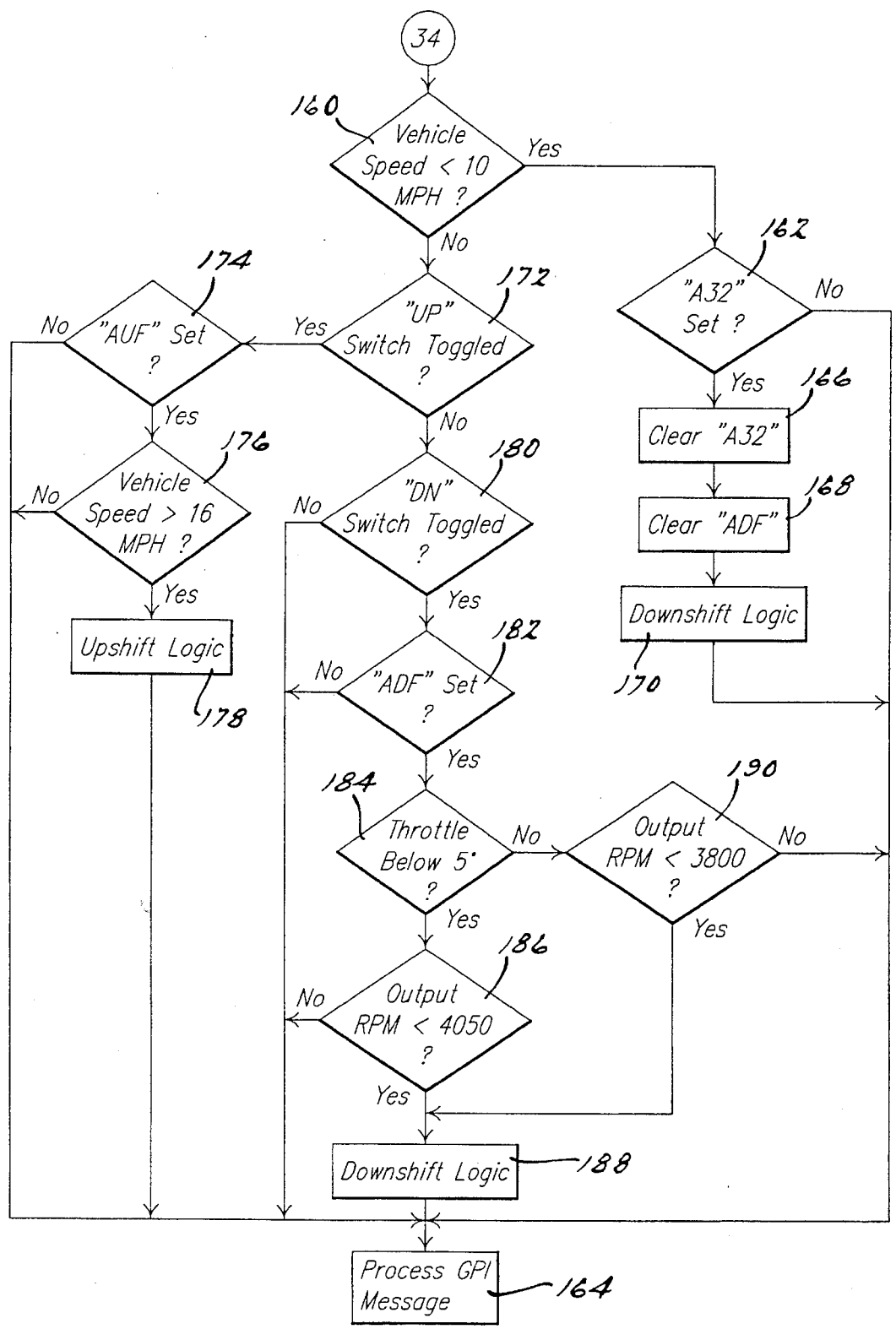

In diamond 158, if third gear is not scheduled, the methodology advances to diamond 191 in FIG. 3E. In diamond 191, the methodology determines whether vehicle speed is less than a predetermined speed such at fifteen (15) mph. If so, the methodology advances to block 192 and clears the autostick downshift flag. The methodology then advances to block 194 and executes the downshift logic in accordance with the shift schedule logic. The methodology then advances to block 196 to process and send a gear position indicator message to be described.

In diamond 191, if the vehicle speed is not less than fifteen (15) mph, the methodology advances to diamond 198 and determines whether the second switch 32 is closed as previously described. If so, the methodology advances to block 194 and executes the downshift logic in accordance with the shift schedule logic. If not, the methodology advances to block 196 previously described.

It should be appreciated that when the shift is completed, the transmission controller 16 sets either the autostick upshift flag (after an upshift) or downshift flag (after a downshift).

Referring again to FIG. 1, an electronic gear display 200, according to the present invention, is shown for use with the electronically-controlled automatic transmission system 10. The electronic gear display 200 displays the selected gears when in the manual or autostick mode of shifting the automatic transmission 12 to provide a feedback mechanism to the vehicle operator. The electronic gear display 200 also displays the position of the shift lever 40 when in the automatic mode of operation of the automatic transmission 12.

The electronic gear display 200 has a plurality, preferably, eight indicators 201 such as LED lights. A first set of indicators 201 are connected to an electronic body controller 202 and correspond to Park, Reverse, Neutral and Overdrive. A second set of indicators 201 are connected to the body controller 202 and correspond to first, second, third and fourth gear. The electronic gear display 200 is controlled by the body controller 202. The body controller 202 and transmission controller 16 communicate with each other over a Chrysler Collision Detection (CCD) communication bus 204. The body controller 202 turns the indicators ON and OFF in accordance with the gear position indicator message. The transmission controller 16 sends the gear position indicator message of blocks 130, 144, 164 and 196 in FIG. 3 to the body controller 202. The gear position indicator message has a Header or identification byte, two (2) data bytes, and an end or checksum byte (conforming to CCD protocol). The gear position indicator message is preferably in hexadecimal format as follows:

Header Byte=Identification
Data Byte 1=X0
Data Byte 2=Unused
End Byte=Check Sum

The gear information is contained in Data Byte 1 as follows:

00 When not in manual mode
10 When in manual first gear
20 When in manual second gear
30 When in manual third gear
40 When in manual fourth gear The transmission controller 16 sends the gear position indicator message to the body controller 202 as soon as the gear changes and periodically thereafter, preferably every eight hundred ninety-six (896) milliseconds. The body controller 202 determines that the transmission system 10 is in a manual mode in accordance with a separate predetermined "PRNDL" position indicator message from the transmission controller 16. If the PRNDL position indicator message indicates that the shift lever 40 is in other than the autostick position, the body controller 202 lights the corresponding indicator 201 (e.g., P, R, N or D). When the shift lever 40 is not in the autostick position, the body controller 202 ignores the gear position indicator message. If, however, the shift lever 40 is in the autostick position, as indicated by the PRNDL position indicator message, the body controller 202 interprets the gear position indicator message and lights the corresponding indicator 201 (e.g., 1, 2, 3, or 4).

When the body controller 202 receives the predetermined code in the Header Byte of the gear position indicator message, the transmission system 10 is a manual transmission system 10. As a result, the body controller 202 turns ON the indicators 201 as encoded in Data Byte 1. In Data Byte 1, the first digit indicates the current gear position used to continuously turn the indicator 201 ON. The second digit of Data Byte 1 indicates a "pending gear" used to flash the corresponding indicator 201 ON and OFF at one second intervals. For example, if Data Byte 1 is 32 (hexadecimal), the body controller 202 would turn the "3" ON and flash the "2" ON and OFF. It should be appreciated that a pending gear is scheduled by the transmission controller 16 when the gear is selected at undesired speeds. It should also be appreciated that the pending gear would become the selected gear when vehicle speed permits, otherwise it times out after a predetermined period of time or if the throttle position or opening is increased.

Additionally, the gear position indicator message is used by the body controller 202 to determine if the vehicle has the autostick system 10. If the body controller 202 does not receive the gear position indicator message for a predetermined period of time, the vehicle has a non-autostick system 10 and the electronic gear display 200 is of the kind that has P, R, N, D, 3 and L indicators 201. As a result, it should be appreciated that only one body controller (one part number) may be used for both autostick and non-autostick system vehicles.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. An electric circuit for manual shifting of an electronically-controlled automatic transmission system having a controller and a shift lever, said electric circuit comprising:

a first momentary contact switch;

a second momentary contact switch;

a voltage divider interconnecting said first switch and said second switch and the controller to allow passing of an input signal from either one of said first switch and said second switch to the controller in response to the shift lever closing the one of said first switch and said second switch, said signal causing said controller to either upshift or downshift said transmission.

2. An electric circuit as set forth in claim 1 wherein said voltage divider comprises a first resistor connected to said first switch and the controller and a second resistor connected to said second switch and the controller.

3. An electric circuit as set forth in claim 2 wherein said first resistor has a resistance value different from said second resistor.

4. An electric circuit for manual shifting of an electronically-controlled automatic transmission system in response to movement of a shift lever, said electric circuit comprising:

an electronic controller;

first and second momentary contact switches associated with the shift lever and connected to an analog-digital converter of said controller; and a voltage divider interconnecting said first and second momentary contact switches and a signal ground of said controller to allow passing of an input signal from either one of said first and second momentary contact switches to said controller in response to the shift lever closing the one of said first and second momentary contact switches.

5. An electric circuit as set forth in claim 4 wherein said voltage divider comprises a first resistor connected to said first switch and said controller and a second resistor connected to said second switch and said controller.

6. An electric circuit as set forth in claim 5 wherein said first resistor has a resistance value different from said second resistor.

7. An electric circuit for manual shifting of an electronically-controlled automatic transmission system in response to movement of a shift lever, said electric circuit comprising:

an electronic controller;

first and second momentary contact switches associated with the shift lever and connected to an analog-digital converter of said controller;

a first resistor connected to said first momentary contact switch and a second resistor connected to said second momentary contact switch, said first switch and second momentary contact switch being connected to a signal ground of said controller, said first resistor having a resistance value different from said second resistor, to allow passing of an input signal from either one of said first and second momentary contact switches to said controller in response to the shift lever closing the one of said first and second momentary contact switches.

* * * * *